United States Patent [19]
Gentry et al.

[11] 3,834,054
[45] Sept. 10, 1974

[54] DECOY ANCHOR STORAGE

[76] Inventors: George W. Gentry, 6034 N. 32nd Ave., Phoenix, Ariz. 85017; Robert W. Jepson, 3109 N. 64th Dr., Phoenix, Ariz. 85033

[22] Filed: Apr. 23, 1973

[21] Appl. No.: 353,383

[52] U.S. Cl. .................................................. 43/3
[51] Int. Cl. .......................................... A01m 31/06
[58] Field of Search .............. 43/3, 2, 42.39, 43.12, 43/43.13, 43.14, 44.96, 44.97; 46/92, 93; 24/129 A; 16/DIG. 8

[56] References Cited
UNITED STATES PATENTS

| | | | |
|---|---|---|---|
| 2,237,194 | 4/1941 | Ohnmacht | 43/3 |
| 2,342,107 | 2/1944 | Agius | 43/3 |
| 2,622,360 | 12/1952 | Bertram | 43/3 |

*Primary Examiner*—Antonio F. Guida
*Assistant Examiner*—Daniel J. Leach

[57] ABSTRACT

An anchor with provision for attachment to an elongated and bulbous keel of a duck decoy consisting of a weight with wire or strip appendages which have a configuration corresponding to the outer configuration of the decoy keel. The appendages are resilient or are resiliently biased to grip the keel when the weight is applied to the keel in an upward motion.

2 Claims, 7 Drawing Figures

PATENTED SEP 10 1974 3,834,054

DECOY ANCHOR STORAGE

In the past, it has been normal practice to attach anchors to decoys by one of three methods:
 a. A circular ring in an anchor to surround a portion of the decoy proper.
 b. Application of squeeze type material to surround a portion of the decoy proper.
 c. A coil spring actuated cord retraction system which winds the cord into a compact coil.

Thus, in order to provide for different lengths of cords, preservation of decoy finish, and a practical, reliable improvement over prior art, we have devised this unique system.

These and other, further and more specific objects and advantages of the present invention will become readily apparent to those skilled in the art from the following detailed description thereof, taken in conjunction with the drawings, in which.

Figure 2:
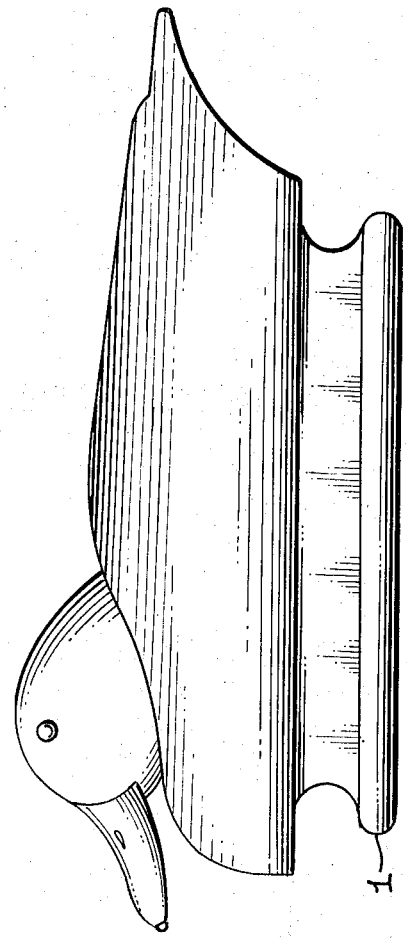
FIG. 2 is an elevation view showing the storage room available on the bulbous keel.
Figure 1:
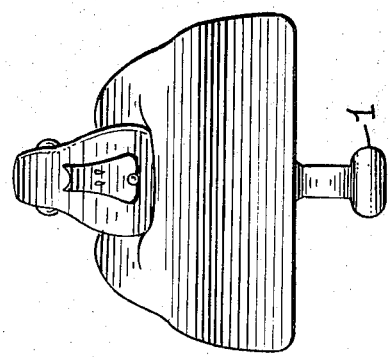
FIG. 1 is an end view of the decoy chosen for purposes of illustrating the preferred configuration of the bulbous keel.

Turning now to the drawing in which the same reference numerals indicate corresponding elements throughout the several views, attention is now directed to FIG. 1 which is an end view of the decoy chosen for purposes of illustrating the preferred configuration of the bulbous keel. First provided is a thickened portion of the base of the keel designated by the reference character 1.

A relatively heavy material used for anchoring purposes is designated by the reference character 2.

Figure 3:
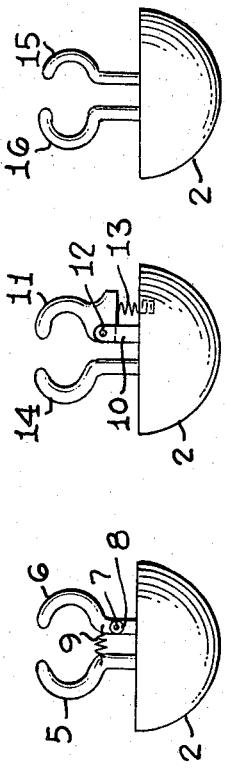
FIG. 3 is an elevation view of a weight utilizing a formed strap for attachment to the bulbous keel.

The several ways to affix anchor weight 2 to bulbous keel 1 are shown in FIGS. 3, 4, 5, 6, and 7 and function as follows:

FIG. 3 illustrates the use of strap 3 affixed to weight 2 which conforms to the outer configuration of bulbous keel 1 when the uppermost tips of strap 3 are touched to the lower extremity of keel 1 and sufficient pressure is applied in an upward motion. The friction connection between strap 3 and keel 1 retain weight 2 in a stored position.

Figure 4:
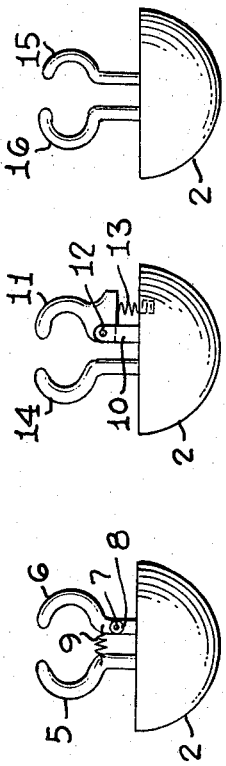
FIG. 4 is an elevation view of a weight utilizing a formed wire for attachment to the bulbous keel.

FIG. 4 illustrates the use of bent wire 4 affixed to weight 2 which conforms to the outer configuration of bulbous keel 1 when the uppermost tips of wire 4 are touched to the lower extremity of keel 1 and sufficient pressure is applied in an upward motion. The friction connection between wire 4 and keel 1 retain weight 2 in a stored position.

Figure 5:
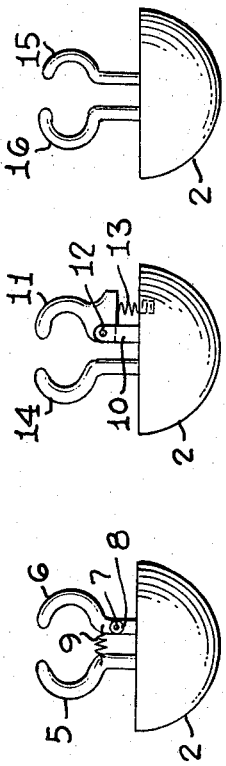
FIG. 5 is an elevation view of a weight utilizing a fixed and movable anvil and tension spring assembly for attachment to the bulbous keel.

FIG. 5 illustrates the use of fixed anvil 5 opposing movable anvil 6, which rotates about pin 7 which is mounted on fixed bolster 8. When the uppermost tips of fixed anvil 5 and movable anvil 6 are touched to the lower extremity of keel 1 and sufficient pressure is applied in an upward motion, movable anvil 6 is forced away from fixed anvil 5 and surrounds the bulbous portion of keel 1. Movable anvil 6 is pulled toward fixed anvil 5 by tension spring 9 which is affixed to both anvil 5 and anvil 6. The mechanical connection between anvil 5 and anvil 6 and keel 1 retain weight 2 in a stored position.

Figure 6:
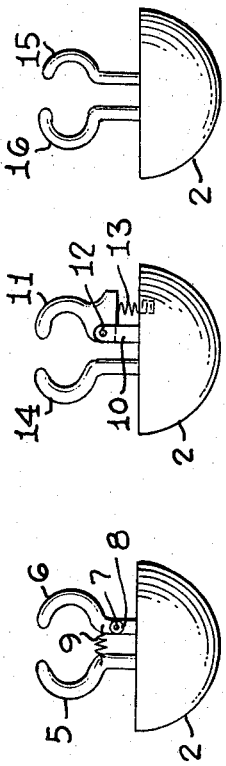
FIG. 6 is an elevation view of a weight utilizing a fixed and movable anvil and compression spring assembly for attachment to the bulbous keel.

FIG. 6 illustrates the use of fixed anvil 14 opposing movable anvil 11 which rotates about pin 12 which is mounted on fixed bolster 10. When the uppermost tips of fixed anvil 14 and movable anvil 11 are touched to the lower extremity of keel 1 and sufficient pressure is applied in an upward motion, movable anvil 11 is forced away from fixed anvil 14 and surrounds the bulbous portion of keel 1. Movable anvil 11 is forced toward fixed anvil 14 by compression spring 13 which is affixed to the lower appendage of movable anvil 11 and attached to weight 2. The mechanical connection between anvil 11 and anvil 14 and keel 1 retain weight 2 in a stored position.

Figure 7:
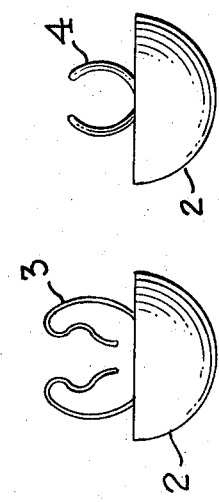
FIG. 7 is an elevation view of a weight utilizing a fixed and movable anvil for attachment to the bulbous keel.

FIG. 7 illustrates the use of fixed anvil 16 opposing movable anvil 15 which conforms to the outer configuration of bulbous keel 1 when the uppermost tips of anvils 15 and 16 are touched to the lower extremity of keel 1 and sufficient pressure is applied in an upward motion. Movable anvil 15 is forced away from fixed anvil 16. The spring tension in movable anvil 15 returns to surround the bulbous portion of keel 1. The friction connection between anvil 15 and anvil 16 and keel 1 retain weight 2 in a stored position.

Having fully described and disclosed our present invention in such clear and concise terms as to enable those skilled in the art to understand and practice the same,

We claim:

1. A combination to allow for storage of a weight on a decoy keel proper, comprising:
 a. A bulbous keel on the bottom of a decoy;
 b. A weight with an attached strip which surrounds the lower extremity of the bulbous keel when pressure is applied in an upward motion.

2. A combination to allow for storage of a weight on a decoy keel proper, comprising:
 a. A bulbous keel on the bottom of a decoy;
 b. A weight with a fixed anvil and a movable anvil which surround the lower extremity of the bulbous keel when pressure is applied in an upward motion.

* * * * *